United States Patent [19]

Nayak et al.

[11] Patent Number: 5,371,636

[45] Date of Patent: Dec. 6, 1994

[54] MECHANISMS FOR A CLOSED LOOP HEAD POSITIONER FOR STREAMING TAPE DRIVES

[75] Inventors: Ashok B. Nayak, Glendora; Kurt A. Buckland, Yorba Linda; Walter Fehlmann, Fountain Valley; Jones V. Howell, Newport Beach; Donald Schilling, Anaheim, all of Calif.

[73] Assignee: Archive Corporation, Costa Mesa, Calif.

[21] Appl. No.: 926,743

[22] Filed: Aug. 6, 1992

Related U.S. Application Data

[63] Continuation-in-part of Ser. No. 502,262, Mar. 30, 1990, abandoned.

[51] Int. Cl.$^5$ .................... G11B 21/02; G11B 5/584
[52] U.S. Cl. .................... 360/75; 360/77.12; 360/78.02
[58] Field of Search ............ 360/78.02, 77.12, 75, 360/77.16, 78.01, 78.03, 78.04, 105, 106, 107, 109, 76, 77.01, 77.15, 77.13; 318/592

[56] References Cited

U.S. PATENT DOCUMENTS

| | | | |
|---|---|---|---|
| 3,526,726 | 9/1970 | Corbett et al. | 360/76 |
| 3,575,422 | 4/1971 | Peltz | 360/78.02 |
| 3,769,467 | 10/1973 | Gabor | 360/103 |
| 4,924,165 | 5/1990 | Kohno | 318/592 |
| 5,191,492 | 3/1993 | Nayak et al. | 360/78.02 |

*Primary Examiner*—Aristotelis Psitos
*Assistant Examiner*—Varsha A. Kapadia
*Attorney, Agent, or Firm*—Fliesler, Dubb, Meyer & Lovejoy

[57] ABSTRACT

Apparatus for fine positioning a tape head relative to a head carriage that is coarsely positionable by a lead screw. The fine positioning apparatus includes parallel first and second resilient support beams oriented generally parallel to the direction of tape travel and having their ends fixedly secured to the head carriage so as to be deflectable in a direction transverse to the direction of tape travel. The centers of the parallel first and second support beams have their centers secured to a tape head frame which contains the tape. A linear motor drives the tape head frame against the resilience of the first and second resilient support beams in response to a drive signal which, for example, is derived from tracking error information produced pursuant to reading of servo information on tape. Pursuant to the displacement of the tape head frame against the resilience of the support beams, the magnetic tape head is moved along a linear path transverse to the tape travel direction. For operation with tapes without servo information on tape, a piezoelectric transducer detects the deflection of one of the support beams and provides an output which is utilized to provide damping of the natural resonance the spring/mass system that includes the first and second resilient support beams and the tape head and tape head frame supported thereby. Alternatively, the operation with tapes without servo tracks can be open-loop with the damping being provided by damping members disposed symmetrically on either side of the tape head frame.

17 Claims, 5 Drawing Sheets

MECHANISMS FOR A CLOSED LOOP HEAD POSITIONER FOR STREAMING TAPE DRIVES

This is a continuation-in-part of copending U.S. application Ser. No. 07/502,262, filed Mar. 30, 1990, and superseded by Ser. No. 07/931,110, filed Aug. 17, 1992, and later issued as U.S. Pat. No. 5,191,492 on Mar. 2, 1993.

BACKGROUND OF THE INVENTION

The present invention relates generally to tape drives, and more particularly to magnetic tape head positioning apparatus for fine positioning of a multiple channel magnetic tape head in a closed loop magnetic tape head positioning system.

Tape drives are commonly utilized as secondary storage devices for back up of the primary storage devices such as disk drives utilized in large computers such as main frames and in small computers such as personal computers. For small computers, tape drives using quarter-inch cartridges (i.e., the width of the tape is nominally one-quarter inch) are widely utilized, since they are relatively small and provide sufficient storage capacities.

An important factor that determines the storage capacity of a tape utilized with a non-rotating magnetic tape head is the number of parallel, longitudinally oriented tracks utilized to record data. In other words, all other factors being the same, more tracks provide more storage capacity. The writing and reading of parallel tracks is achieved by magnetic tape head positioning apparatus for positioning the magnetic tape head at different locations in the transverse direction relative to the tape and its direction of travel.

Typically, the magnetic tape head positioning apparatus includes a stepper motor, an externally threaded lead screw driven by the stepper motor, and a head carriage assembly which supports the magnetic tape head and is driven by the lead screw along a path transverse to the tape travel direction. For writing and reading, the magnetic tape head is positioned at a location transverse to the tape movement axis as determined by the calibration of the particular tape drive for unformatted tapes, or as close to the center of a track as defined by servo information in a pre-formatted tape. In either event, the magnetic tape head would be positioned at one of the incremental locations defined by the stepper motor. Due to manufacturing variations in the tape drive and the tape cartridge, the magnetic tape head might not be positioned at the location wherein the read or write elements of the tape head are centered on the track or tracks being accessed.

The consequences of imprecise magnetic tape head positioning include distortion and low signal amplitude upon playback on a drive different from the one that wrote a tape, or even the inability to read a tape written by another drive. Further, magnetic tape head positioning apparatus that is not capable of precise head positioning places limitations on track density.

SUMMARY OF THE INVENTION

It would therefore be an advantage to provide magnetic tape head positioning apparatus that is capable of very precise magnetic tape head positioning.

Another advantage would be to provide magnetic tape head positioning apparatus having greater positioning precision than increments of a stepper motor.

The foregoing and other advantages are provided by the invention in apparatus for fine positioning a multiple channel tape head relative to a head carriage frame that is coarsely positionable by a lead screw. The fine positioning apparatus includes parallel first and second resilient support beams oriented generally parallel to the direction of tape travel and having their ends fixedly secured to the head carriage frame so as to be deflectable in a direction transverse to the direction of tape travel. The centers of the parallel first and second support beams have their centers secured to a tape head frame which contains the magnetic tape head. A linear motor drives the tape head frame against the resilience of the first and second resilient support beams in response to a drive signal which, for example, is derived from tracking error information produced pursuant to reading of servo information on tape. Pursuant to the displacement of the tape head frame against the resilience of the support beams, the magnetic tape head is moved along a linear path transverse to the tape travel direction. For operation with tapes without servo tracks, a piezoelectric transducer detects the deflection of one of the support beams and provides an output which is utilized to provide damping of the natural resonance the spring/mass system that includes the first and second resilient support beams and the tape head and tape head frame supported thereby. Alternatively, the operation with tapes without servo tracks can be open-loop with the damping being provided by damping members disposed symmetrically on either side of the tape head frame.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
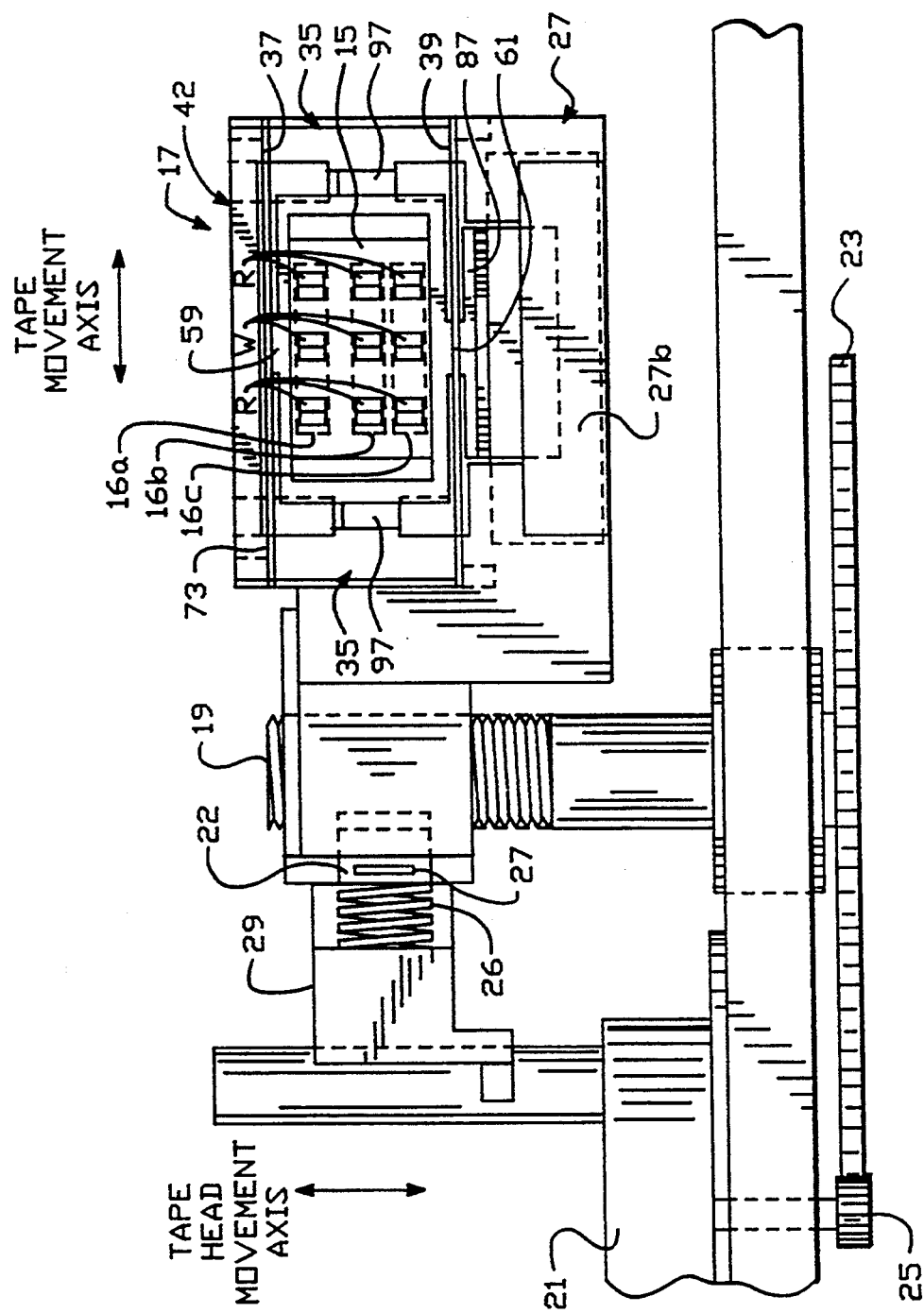
FIG. 1 is a schematic elevational illustrating an implementation of a fine positioning apparatus in accordance with the invention for finely positioning a multiple channel magnetic tape head.

In the following detailed description and in the several figures of the drawing, like elements are identified with like reference numerals.

Figure 2:
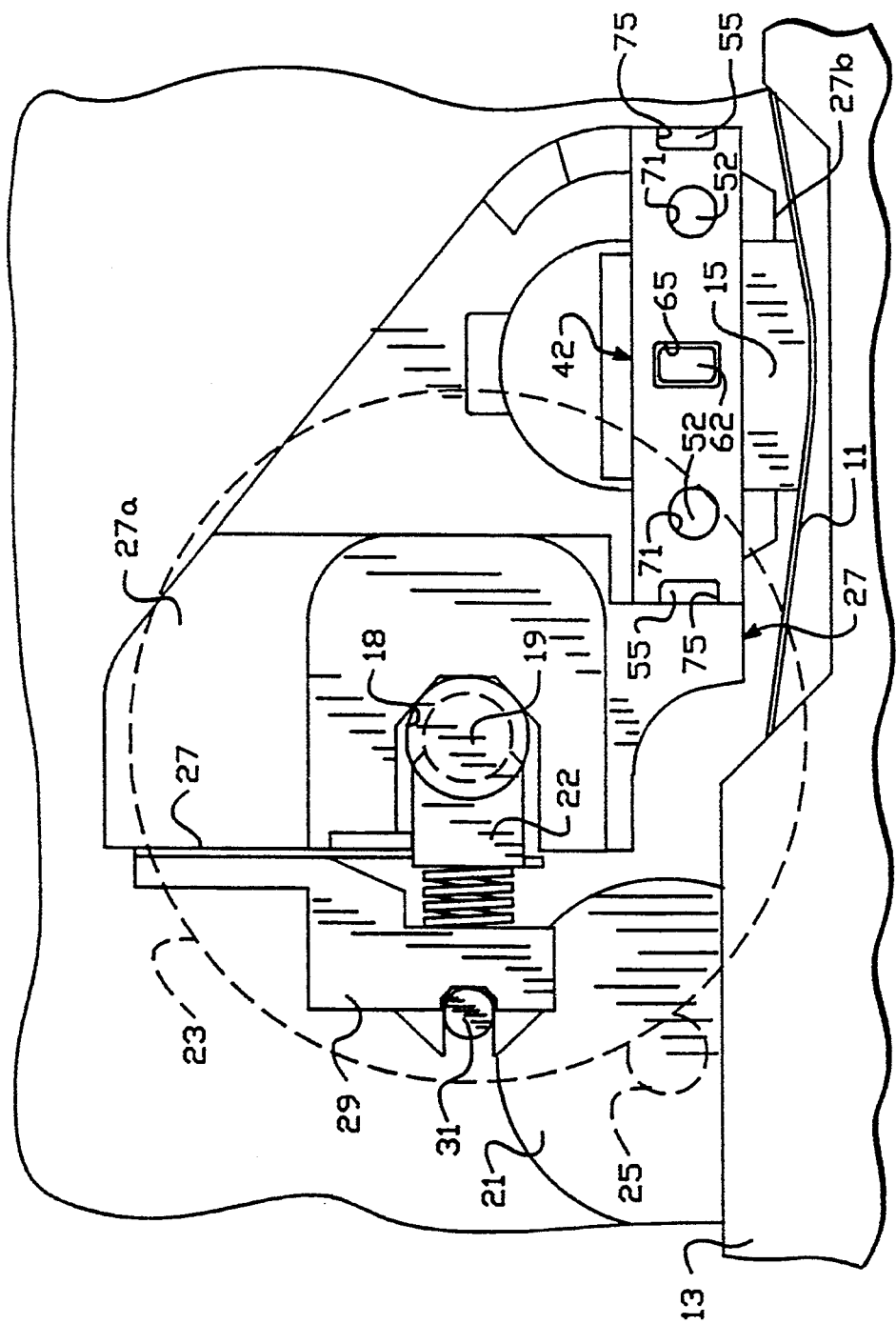
FIG. 2 is a schematic plan view of the magnetic tape head positioning fine positioning apparatus of FIG. 1.

Referring now to FIGS. 1 and 2, set forth therein are schematic elevational and plan views of a tape head carriage 17 that implements apparatus in accordance with the invention for fine positioning of a multiple channel magnetic tape head 15 which writes and reads a magnetic tape 11 stored in a tape cartridge 13 that is supported in a conventional manner in a tape drive that includes the tape head carriage 17. The multiple channel tape head 15 includes a plurality of channels wherein each channel accesses a track on the tape and includes at least one write element and at least one read element. The tape head 15 as shown in FIG. 1 includes by way of illustrative example three channels 16a, 16b, 16c, wherein each channel includes a write element W and two read elements R on either side of the write element. The fine positioning apparatus of the invention provides for fine positioning of the multiple channel tape head 15 when utilized with formatted tapes that contain dedicated servo tracks, one of which will be accessed by a read element of one of the tape head channels during a write or read operation. An example of a servo track system with which the invention can be utilized is disclosed in U.S. Pat. No. 5,008,765, incorporated herein by reference. In order to accommodate unformatted tapes that do not include servo tracks, the invention further provides for stabilization of vibrational disturbances of the multiple channel tape head.

The magnetic tape 11 is engaged against the multiple channel magnetic tape head 15 is moved along the tape movement axis across the face of the multiple channel magnetic tape head for write and read operations. The multiple channel magnetic tape head 15 is supported by the head carriage 17 which in turn is supported by a lead screw 19 whose longitudinal axis is transverse to the tape movement axis. The lead screw 19 is rotated by a stepper motor 21 via a pinion gear 25 that is fixed to the output shaft of the stepper motor and engaged with gear 23 that is fixed to the lead screw 19. Rotation of the lead screw 19 thus moves the tape head 15 transversely across the tape along the tape head movement axis.

The lead screw 19 is supported by bearings secured to the drive frame, and the stepper motor 21 is also secured to the drive frame, so as to provide for a rigid and fixed relation between the lead screw and the stepper motor output shaft. A specific example of a lead screw supporting structure is disclosed in commonly assigned U.S. application Ser. No. 07/546,025, filed Jun. 29, 1990, by Nayak et al., and entitled "GEAR DRIVE CARRIAGE AND STEPPER ADJUSTMENT SYSTEM," incorporated herein by reference.

Figure 3:
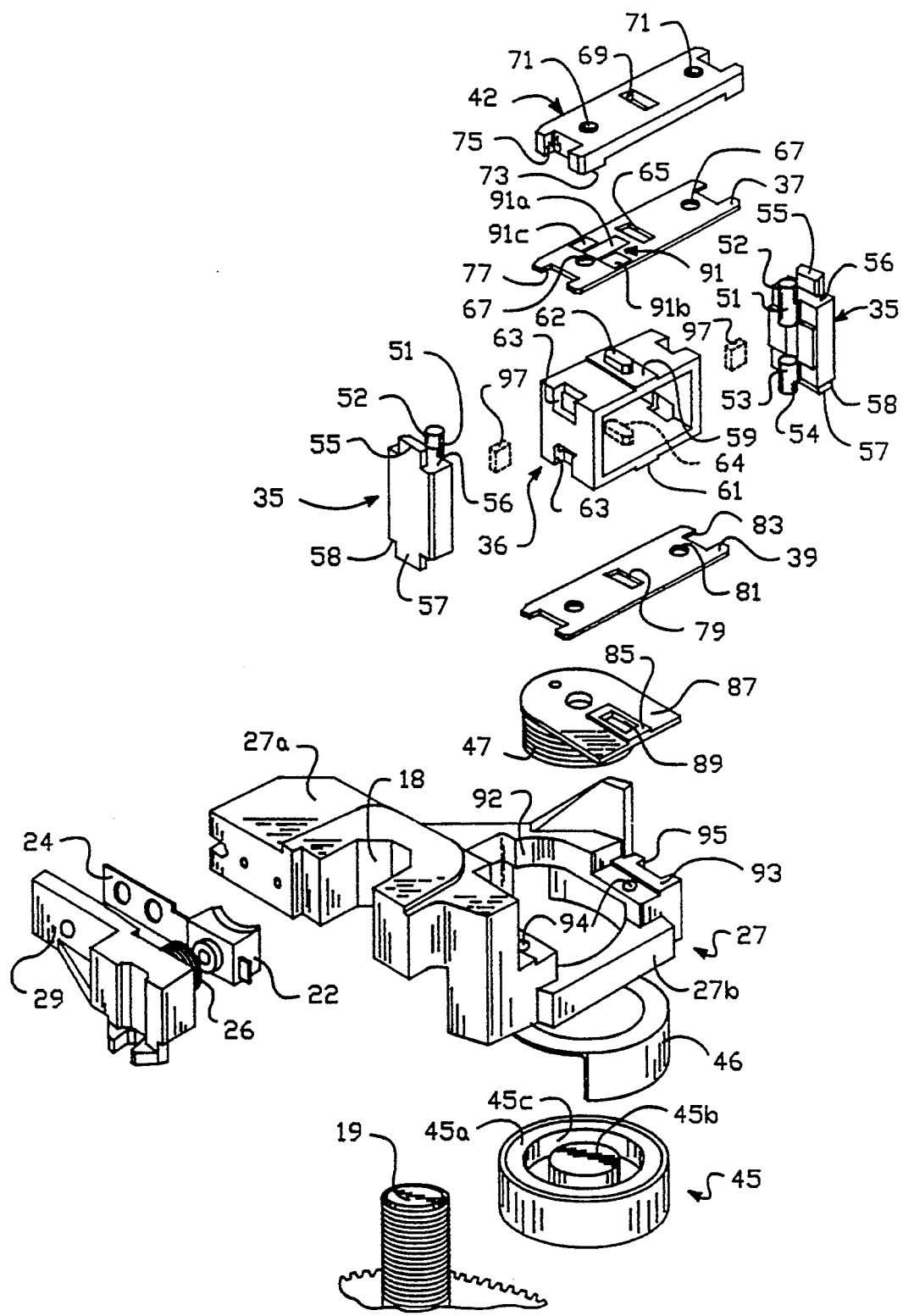
FIG. 3 is a schematic exploded view of the magnetic tape head fine positioning apparatus of FIG. 1.
Figure 4:
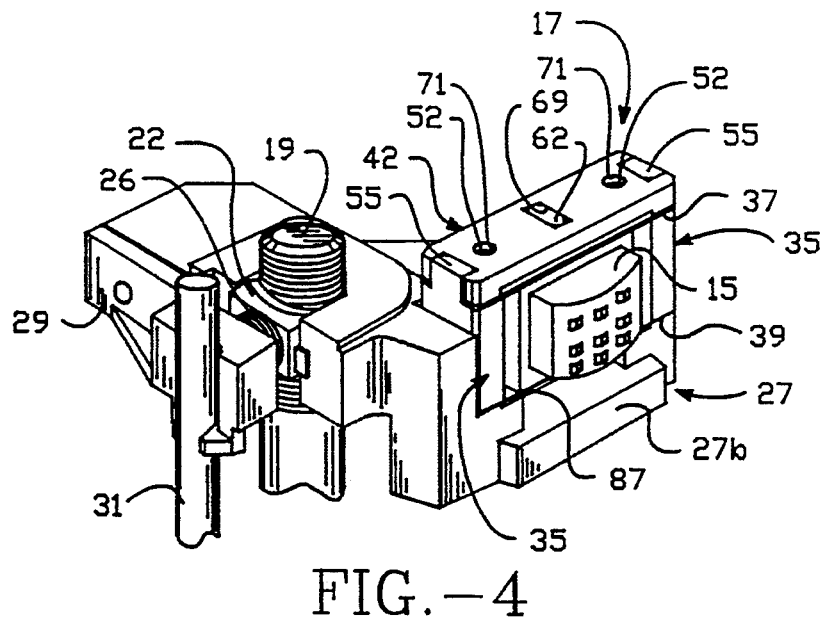
FIG. 4 is a perspective view of the magnetic tape head fine positioning apparatus of FIG. 1.

Referring also to FIG. 3, the tape head carriage 17 includes a base section 27 that includes vertically offset subsections 27a and 27b. A vertically extending recess 18 is provided in the higher subsection 27a and is configured to accommodate the lead screw 19, as shown in FIG. 2. Positioned directly opposite the recess 18 is a partial nut 22 having threads engaged with the threads of the lead screw 19. The partial nut 22 is supported by a thin flexible planar support member 24 having a portion thereof engaged in a slot in the partial nut 22. The thin flexible planar support member 24 is clamped between a vertical surface on the higher base subsection 27a and a surface of an anti-rotation arm 29 which that is secured to the higher base subsection 27a by appropriate fasteners. The thin flexible planar support member 24 allows for movement of the partial nut laterally relative to the longitudinal axis of the lead screw 19, but substantially prevents motion of the partial nut relative to the head carriage along the longitudinal axis of the lead screw 19. A coil spring 26 located between the anti-rotation arm and the partial nut 22 provides a biasing force to the partial nut to engage the partial nut with the lead screw. A slot in the anti-rotation arm 29 engages a vertically extending anti-rotation shaft 31, as shown in FIG. 2. The engagement of the anti-rotation arm 29 on the anti-rotation shaft 31 prevents rotation of the head carriage 17 while permitting displacement thereof transversely to the tape movement axis pursuant to the rotation of the lead screw. Examples of structures for supporting a tape head carriage on a lead screw are disclosed in previously cited commonly assigned U.S. application Ser. No. 07/546,025, and in commonly assigned U.S. Pat. No. 4,747,004, incorporated herein by reference.

The lower base subsection 27b of the head carriage 17 forms a rigid head carriage frame with first and second vertical side supports 35 that face each other, and a top support 42. Each side support 35 includes vertically oriented upper and lower standoffs 51, 53 whose ends comprise upper and lower cylindrical pegs 52, 54. The upper and lower standoffs 51, 53 of each side support 35 are separated by a gap which extends into a recess in the side support such that the upper and lower limits of the gap and recess are oval areas. Each side support 35 further includes upper and lower tabs 55, 57 that are outside the top and bottom cylindrical pegs 52, 54. Each side support 35 further includes an upper flat surface 56 that is adjacent and between the upper peg 52 and tab 55, and a lower flat surface that is adjacent and between the lower peg 54 and tab 57.

The top support 42 includes standoffs 73 and recesses 75 at each end, and apertures 71 inboard of the recesses 75. The recesses 75 engage the upper tabs 55 of the side supports 35, while the apertures 71 contain the upper pegs 52 of the side supports 35. The top support 42 further includes a centrally located clearance opening 69 that is configured to allow vertical movement of an upper positioning tab 62 on a top standoff 59 of a tape head housing 36 which is suspended by the upper resilient spring beam 37 and a lower resilient spring beam 39 in the rigid tape head carriage frame that comprises the side supports 35, the top support 37, and the lower base subsection 27b.

The tape head housing 36 is generally rectangular and includes upper and lower walls and side walls. Centrally located on the outside of the upper and lower walls are upper and lower standoffs 59, 61. Located at the respective geometric centers of the top and bottom walls of the tape head housing 36 on the upper and lower standoffs 59, 61 are upper and lower spring beam positioning tabs 62, 64 that extend upwardly and downwardly, respectively. Cutouts 63 in the corners of the tape head housing 36 accommodating the side support standoffs 51, 53.

The upper resilient spring beam 37 and lower resilient spring beam 39 are substantially parallel to each other and to the tape movement axis, and suspend the head housing 36 so that it can be finely positioned relative to the base 27 along the head movement axis that is transverse to the tape movement axis.

The upper resilient spring beam 37 includes a central opening 65 engaged with the upper positioning tab 62 of the tape head housing 36, and the lower resilient spring beam 39 includes central opening 79 engaged with the lower positioning tab 64 of the tape head housing 36. The opening 65 and the tab 62 are designed to provide a good dimensional fit to locate the upper resilient spring beam 37, and the opening 79 and the tab 64 are designed to provide a good dimensional fit to locate the lower resilient spring beam 39. By way of illustrative example, the center portion of the upper resilient spring beam 37 is secured with adhesive to the upper standoff 59 and, similarly, the center portion of the lower resilient spring beam 39 is secured by adhesive to the lower standoff 61.

The upper resilient spring beam 37 further includes apertures 67 engaged with the upper cylindrical pegs 52, and recesses 77 at its ends for engaging the upper tabs 55 of the side supports 35. The lower resilient spring beam 39 further includes apertures 81 engaged with the lower pegs 54, and recesses 83 for engaging the lower tabs 57 of the side supports 35. The apertures 67 of the upper resilient spring beam 37 and the upper cylindrical pegs 52 engaged thereby are dimensioned so that the upper resilient spring beam 37 is precisely positioned; and the apertures 81 of the lower resilient spring beam 39 and the lower cylindrical pegs 54 engaged thereby are dimensioned so that the lower resilient spring beam 39 is precisely positioned. The precise positioning of the upper and lower resilient spring beams allows for the precise securement of the tape head housing to the geometrical centers of the portions of the spring beams that are between the secured ends, which insures that the tape head housing will move substantially linearly. Such linear movement allows for precise alignment between the voice coil and the pole piece of a voice coil motor which, as described further herein, can be utilized to position the tape head housing. Moreover, the precise location of the tape head housing maintains equal width gaps between the side supports and the sides of the tape head housing, which allows damping material disposed on either side of the tape housing, as also described further herein, to act symmetrically on the tape head housing.

The upper ends of the side supports 35 and the ends of the top support member 42 are secured to each other to form a rigid connection and to clamp the ends of the upper resilient spring beam 37. For example, such rigid connection and clamping can be achieved by adhesive between the standoffs 73 and the top surfaces of the ends of the upper resilient spring beam 37, and adhesive between the upper flat surfaces 56 of the side supports 35 and the bottom surfaces of the ends of the upper resilient spring beam 37, whereby the ends of the upper spring beam are constrained or sandwiched between the standoffs 73 of the top support and the upper flat surfaces 56 of the side supports.

The lower base subsection 27b includes on an aperture 94, a standoff 93, and a recess 95 on either side of an opening 92. The apertures 94, the standoffs 93, and the recesses 95 are respectively engaged with the lower pegs 54, the lower flat surfaces 58, and the lower tabs 57 of the side supports 35.

The lower ends of the side supports 35 and the standoffs 93 of the lower base subsection 27b are secured to each other to form a rigid connection and to clamp the ends of the lower resilient spring beam 39. For example, such rigid connection and clamping can be achieved by adhesive between the standoffs 93 and the bottom surfaces of the ends of the lower resilient spring beam 39, and adhesive between the lower flat surfaces 58 of the side supports 35 and the bottom surfaces of the ends of the lower resilient spring beam 39, whereby the ends of the lower spring beam are constrained or sandwiched between the standoffs 93 of the lower base subsection 27b and the lower flat surfaces 58 of the side supports.

Thus, pursuant to the clamping of the ends of the parallel resilient spring beams 37, 39 by components of the rigid head carriage frame comprised of the side supports 35, the top support 42, and the lower base subsection 27b which are securely connected to each other, the ends of the upper and lower resilient spring beams 37, 39 are fixedly and immovable secured relative to the head carriage frame, while the center portions thereof which support the tape head housing 36 are deflectable along the tape head movement axis which is transverse to the tape movement axis.

As suspended between the spring beams 37, 39, the tape head housing is movable by a linear motor, which by way of example is disclosed as a voice coil motor that includes a voice coil 47, a cover plate secured to the top of the voice coil, an annular pole piece assembly 45 having an outer pole piece 45a and an inner pole piece 45b that form an annular gap 45c therebetween. A magnetic shield 46 covers the top and part of the exterior wall of the outer pole piece. The opening 92 in the lower base subsection 27b is configured to accommodate the vertical movement of the voice coil 47, and the pole piece assembly 45 and magnetic shield 46 are secured to the base subsection 27b below the opening 92 such that the voice coil 47 is linearly movable in the annular gap of the pole piece assembly 45 along the longitudinal axis of the pole piece assembly. Part of the cover plate 87 extends beyond the cylindrical form of the voice coil 47, and the edge of the base subsection 27b underlying the extended portion of the cover plate 87 is recessed to accommodate the vertical movement of the cover plate 87 which is secured to the tape head housing 36.

More particularly, the lower cover plate 87 includes a standoff 85 and an opening 89 within the standoff 85, and the standoff 85 is secured, for example by adhesive, to the center of the bottom of the lower resilient beam 39, with the tab 64 of the tape head housing in the opening 89 of the cover plate 87. In this manner, movement of the voice coil 47 causes the movement of the tape head housing 36 along the tape head movement axis.

It should be appreciated that while the foregoing has described the use of adhesive for the interconnections of various elements including the side supports, the top support, the lower base subsection, the resilient spring beams, the tape head housing, and the voice coil cover, other conventional means for securement can be utilized, including for example screw fasteners, rivets, or swaged connections.

Figure 5:
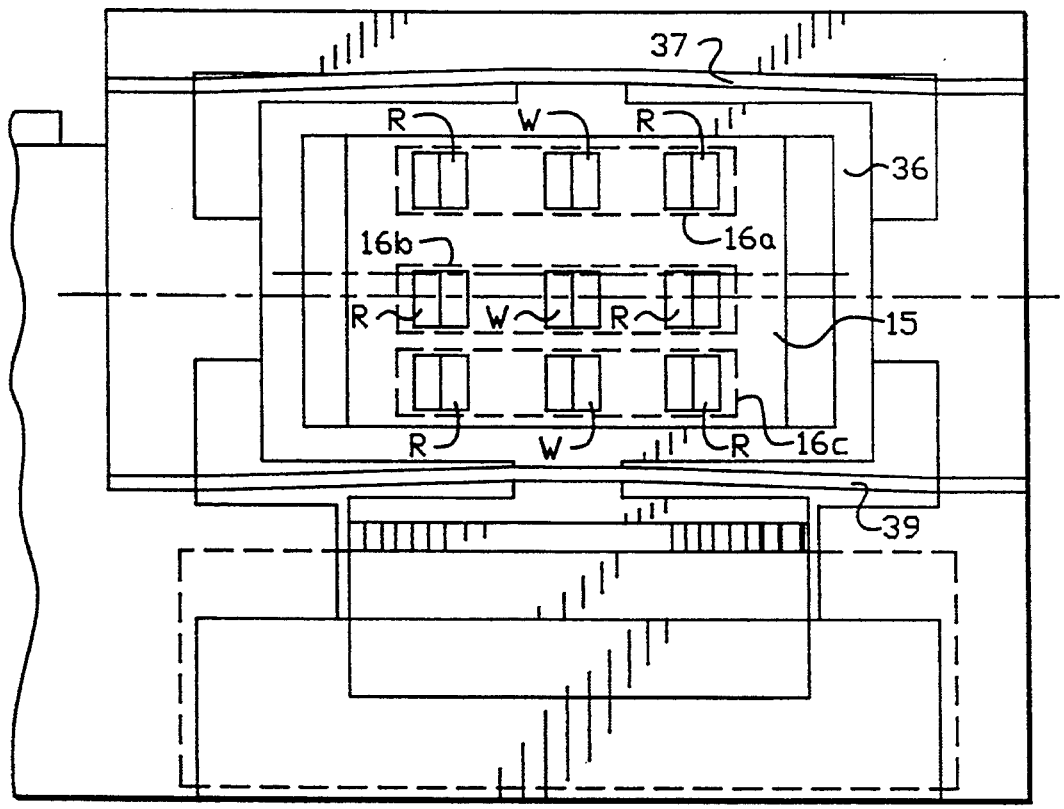
FIG. 5 is a schematic elevational view illustrating the upward positioning of the multiple channel magnetic tape head pursuant to upward deflection of the fine positioning apparatus of FIG. 1.
Figure 6:
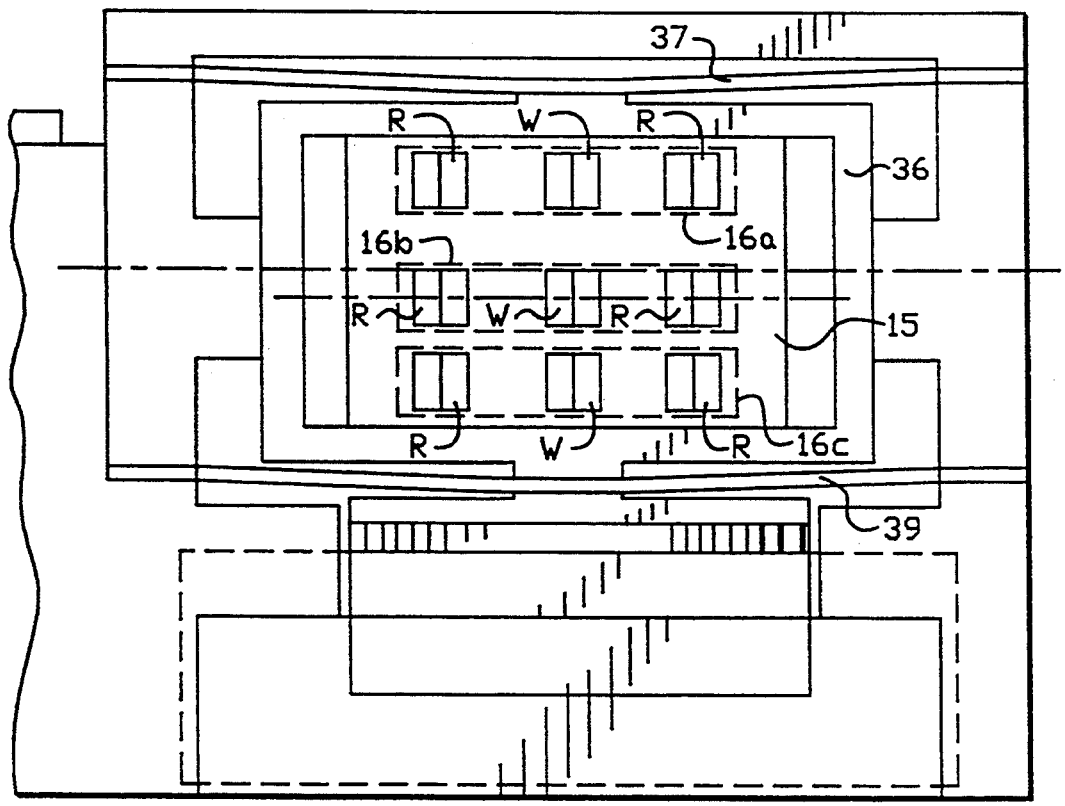
FIG. 6 is a schematic elevational view illustrating the downward positioning of the magnetic tape head pursuant to downward deflection of the fine positioning apparatus of FIG. 1.

As a result of (a) securing the centers of the top and bottom walls of the tape head housing 36 to the centers of spring beam supports 37, 39, and (b) securing the ends of the parallel spring beam supports 37, 39 to the rigid head carriage frame comprised of the side supports 35, the top support 42 and the base subsection 27b of the head carriage base 27, the tape head housing 36 and the multiple channel tape head 15 are constrained to be movable only in a substantially straight line with minimal skew along the tape head movement axis relative to the rigid tape head carriage frame, wherein the tape head movement axis is transverse to the tape movement axis. Thus, actuation of the linear motor 41 causes the tape head 15 to move in a substantially straight line with minimal skew. FIG. 5 schematically illustrates the fine positioning apparatus with the resilient beams deflected upwardly pursuant to upward displacement of the tape head housing by the linear motor 41, while FIG. 6 schematically illustrates the fine positioning apparatus with the resilient beams deflected downwardly pursuant to downward displacement of the tape head housing by the linear motor 41.

The foregoing fine positioner is controlled by a servo circuit, implemented for example in accordance with known techniques, for finely positioning the multiple channel tape head 15 pursuant to position error information provided by servo tracks contained in a formatted multitrack tape. For use with tapes without servo tracks, a damping mechanism is provided to damp the natural resonance of the spring/mass system that includes the first and second resilient support beams and the multiple channel tape head and tape head frame supported thereby.

One damping mechanism includes a piezoelectric transducer 91 that is secured, for example by adhesive, to the top of the upper resilient beam 37 on one side of the center portion thereof. The piezoelectric transducer 91 includes a rectangularly shaped main portion 91a, and side portions 91b, 91c on each side of the main portion 91a at one end thereof. In accordance with conventional piezoelectric transducer designs, the main portion 91a comprises a multilayer element having top and bottom layers across which a potential is produced when the main portion 91a is mechanically deformed. The side portions 91b, 91c comprise extensions of the top and bottom layers of the main body portion 91a, and respective wire leads (not shown) are conductively connected the side portions 91b, 91 by conventional means including, for example, conductive pads or rivets. The piezoelectric transducer 91 deflects pursuant to the deflection of the upper resilient beam 37 and thus produces a transducer voltage that is indicative of the deflection of the upper resilient beam 37. For tapes without servo tracks, the output voltage of the transducer 91 is the feedback signal to the servo circuit which drives the linear motor to dampen the vibration of the spring/mass system including the first and second resilient support beams and the tape head and tape head frame supported thereby at frequencies greater than a relatively low frequency that is, for example, within the range of about 5 to 20 Hz.

An alternative damping mechanism includes the use of damping members 97, comprising, for example, a visco elastic polymer such the "Scotchdamp" brand SJ2015X visco elastic polymer Type 110 available from 3M, St. Paul, Minn., which are secured between each side wall of the tape head housing 36 and the recess between the upper and standoffs of the corresponding side support 35. The damping members 97 are symmetrically disposed on either side of the tape head housing 36, and particularly function to damp and absorb the energy released when the spring mass system comprising the spring beams 37, 39, the tape head housing 36, the tape head 15, the voice coil 47, and the cover plate 87 operates in a resonance mode. Such damping is necessary to keep the amplitudes of vibration at an acceptable limit when the fine positioner is being utilized with a tape without servo tracks and the voice coil motor is not being driven.

Figure 7:
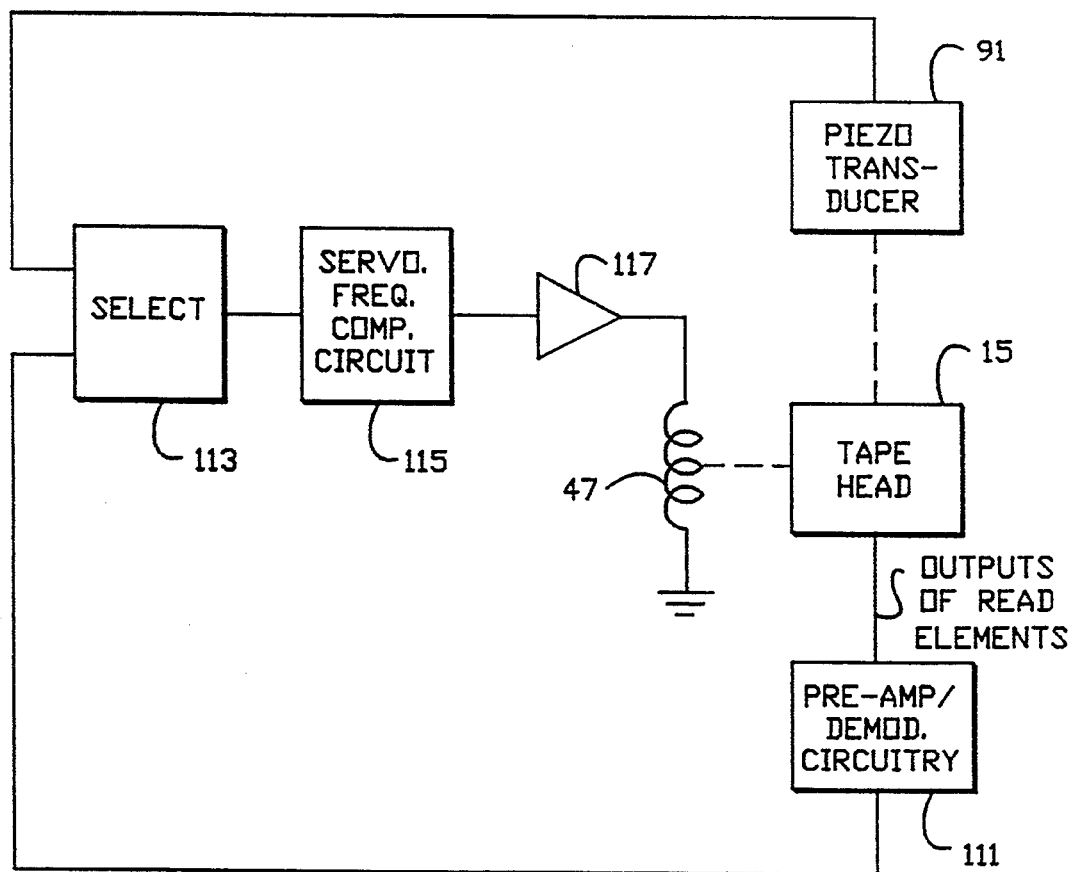
FIG. 7 is a simplified block diagram illustrating the servo operation of the fine positioning apparatus of FIG. 1.

Referring now to FIG. 7, set forth therein is a simplified block diagram of a servo circuit that illustrates the servo operation of the fine positioner as implemented with the piezoelectric transducer 91 for providing information that is utilized to provide damping when reading or writing a tape without servo tracks. The servo circuit includes pre-amplifier/demodulator circuitry 111 that is responsive to the outputs of the read elements of the tape head 15 and provides a tracking error voltage $e_o$ which is proportional to the physical tracking error represented as $E_y$; that is, $e_o = K*E_y$, where K is a constant. The tracking error voltage $e_o$ can be based on the tracking error detected by one read element reading a servo track, or it can be based on the average tracking error detected by two read elements reading respective servo tracks. The use of servo tracks for tape head positioning is disclosed in previously cited U.S. Pat. No. 5,008,765, incorporated herein by reference.

The tracking error voltage $e_o$ is provided to a selection circuit 113 which receives the output of the piezo transducer 91 as another input. The selection circuit 113 is controlled to provide one of its inputs to a servo frequency compensation circuit 115 which provides a motor control output for a voice coil driver 117 that drives the voice coil 47. The selection circuit 113 is controlled such that its output is either (a) a replica of the tracking error voltage $e_o$ when the tape being read or written includes servo tracks, or (b) a replica of the piezoelectric transducer output when the tape being read or written does not include servo tracks. By way of illustrative example, the servo frequency compensation circuit can include a PID (proportional, integral, differential) filter for system stability, in accordance with known servo techniques.

For implementation of the fine positioner with damping members instead of the piezoelectric transducer, the servo circuit could be similar to that of FIG. 7, except that the selection circuit 113 would not be required.

The foregoing has been a disclosure of magnetic tape head positioning apparatus that achieves very precise head positioning and advantageously provides for more accurate reading of tapes and allows for a greater number of tracks on tape.

Although the foregoing has been a description and illustration of specific embodiments of the invention, various modifications and changes thereto can be made by persons skilled in the art without departing from the scope and spirit of the invention as defined by the following claims.

What is claimed is:

1. In a tape drive having a multiple channel magnetic tape head, a head carriage frame, and a coarse positioning mechanism for moving the head carriage frame in a transverse direction, along a path generally transverse to a tape movement axis to position the head carriage frame at coarse positions, an apparatus for fine positioning the multiple channel magnetic tape head relative to the head carriage frame, comprising:

first and second parallel resilient support beams oriented generally parallel to the direction of tape travel and having their ends fixedly and immovably secured to the head carriage frame so that the center portions of the resilient support beams are deflectable relative to the head carriage frame in the direction transverse to the tape travel direction;

a movable tape head housing for supporting the magnetic tape head, said tape head housing being positioned between said first and second parallel support beams and secured to the centers of said first and second resilient support beams such that said tape head housing is suspended by said first and second parallel support beams, and further such that deflection of the centers of said first and second resilient support beams causes said tape head housing to move in the transverse direction relative to the head carriage frame;

a voice coil connected to one or both of the movable tape head housing and a center of one of the resilient support beams, said voice coil forming a movable part of a linear motor attached to said head carriage frame, the voice coil moving in the transverse direction relative to the frame when driven:

voice-coil drive means, responsive to a supplied drive signal, for driving the voice coil and thereby displacing said tape head housing relative to the head carriage frame in response to the drive signal; and vibration dampening means, operatively coupled to the magnetic head, for damping vibrations of the multiple channel tape head caused by force imparted from the voice coil to the mass-spring subsystem comprised of said first and second resilient support beams, said tape head housing and said magnetic tape head.

2. The apparatus of claim 1 wherein said vibration dampening means includes deflection detecting means, operatively coupled to at least one of said resilient support beams and/or to said voice coil, for detecting deflection of the corresponding at least one resilient support beam and/or tape head and for outputting a deflection signal indicative of the deflection of the tape head, and wherein the apparatus further includes:

feedback means, responsive to the deflection signal and operatively coupled to the voice coil, for applying a vibration dampening signal to the voice coil.

3. The apparatus of claim 2 wherein said deflection detecting means comprises a piezoelectric transducer attached to one of said resilient support beams.

4. The apparatus of claim 1 wherein said vibration dampening means includes damping material secured between the head carriage frame and said tape head housing.

5. The apparatus of claim 4 wherein said damping material comprises a visco elastic material.

6. In a tape drive having a multiple channel magnetic tape head, a head carriage frame for supporting the magnetic tape head, and a coarse positioning mechanism for moving the head carriage frame along a path generally transverse to a tape movement axis to position the head carriage frame at discrete coarse positions, an apparatus for fine positioning the multiple channel magnetic tape head relative to the head carriage frame, the apparatus comprising:

suspending means for suspensively and resiliently attaching the tape head to the head carriage frame and for resiliently constraining movement of the tape head relative to the head carriage frame, substantially to a straight line transvere to the tape movement axis;

a voice coil motor operatively coupled for displacing the magnetic tape head substantially along said straight line in response to a supplied motor drive signal;

vibration dampening means for damping vibrations of the resiliently suspended multiple channel tape head; and strain detecting means, operatively coupled to the suspending means, for detecting strain in the suspending means indicative of movement of the tape head, and for outputting a strain signal indicative of the detected strain; wherein said vibration dampening means is responsive to the strain signal output by the strain detecting means.

7. A fine positioning system for fine positioning of a magnetic head relative to tracks of a multi-track magnetic medium, wherein the magnetic head is supported on a coarsely positioned frame, the fine positioning system comprising:

a first spring having a first portion coupled to a first end of the magnetic head and a second portion coupled to the coarsely positioned frame;

a second spring having a first portion coupled to a second end of the magnetic head and a second portion coupled to the coarsely positioned frame;

a voice coil motor having a movable voice coil coupled to the second end of the magnetic head and a stator attached to the coarsely positioned frame;

wherein the magnetic head is movably suspended by the first and second springs relative to the coarsely positioned frame and displaced relative to the coarsely positioned frame by actuation of said voice coil motor; and the system further comprises:

vibration dampening means, operatively coupled to the mass-spring subsystem comprised of said first and second springs and said magnetic head, for damning vibrations in the mass-spring subsystem caused by force imparted from the voice coil to the mass-spring subsystem.

8. The fine positioning system of claim 7 wherein the first and second springs are substantially identical and symmetrically disposed about the magnetic head so as to resiliently constrain movement of the magnetic head relative to coarsely positioned frame, to a substantially linear path extending transversely relative to the tracks of the multi-track magnetic medium.

9. The fine positioning system of claim 8 wherein the respective first and second springs extend in parallel relation to one and in transverse relation to said substantially linear path, wherein the respective first portions of the first and second springs are positioned substantially in the middle of their respective springs, and wherein a strain gauge means is attached to at least one of the first and second springs for measuring strain in said at least one spring.

10. The fine positioning system of claim 7 wherein the voice coil is positioned adjacent to the second end of the magnetic head and the fine positioning system further comprises:

magnetic shielding means disposed about the voice coil motor for shielding the magnetic head from magnetic fields of the voice coil motor.

11. The fine positioning system of claim 7 wherein the stator of the voice coil motor includes an annular outer pole piece surrounding an inner pole piece to define an annular gap between the outer and inner pole pieces, and wherein the voice coil reciprocates in said annular gap.

12. The fine positioning system of claim 7 wherein the coarsely positioned frame has an opening defined therethrough and the voice coil reciprocates in said opening.

13. A fine positioning system for fine positioning of a magnetic head relative to tracks of a multi-track magnetic medium, wherein the magnetic head is supported on a coarsely positioned free, the fine positioning system comprising:

a first spring having a first portion coupled to a first end of the magnetic head and a second portion coupled to the coarsely positioned frame;

a second spring having a portion coupled to a second end of the magnetic head and a second portion coupled to the coarsely positioned frame; and a voice coil motor having a movable voice coil coupled to the second end of the magnetic head and a stator attached to the coarsely positioned free:

wherein the magnetic head is movably suspended by the first and second springs relative to the coarsely positioned frame and displaced relative to the coarsely positioned frame by actuation of said voice coil motor;

wherein the head is prone to vibrate as a result of force imparted from the voice coil to the mass-spring subsystem comprised of said first and second springs and the head, and said system further comprises:

deflection detecting means, operatively coupled to at least one of said first and second springs for detecting deflection of the at least one spring and for outputting a deflection indicating signal indicative of the deflection of the at least one spring; and feedback means, coupled to receive the deflection indicating signal and operatively coupled to the voice coil, for applying a vibration dampening signal to the voice coil.

14. The fine positioning system of claim 13 further comprising:

switch means, coupled to the deflection detecting means and to the feedback means, for selectively rendering the feedback means responsive or nonresponsive to the deflection indicating signal.

15. The fine positioning system of claim 14 wherein the switch means makes the feedback means responsive to the deflection indicating signal in the case where the magnetic head is being aligned to a track not having an alignment servo signal and wherein the switch means makes the feedback means nonresponsive to the deflection indicating signal in the case where the magnetic head is being aligned to a track having an alignment servo signal.

16. The fine positioning system of claim 13 wherein the deflection detecting means includes strain gauge means for measuring strain in said at least one of said first and second springs.

17. The fine positioning system of claim 16 wherein the strain gauge means includes a piezoelectric transducer secured to a portion of the at least one spring.

* * * * *

UNITED STATES PATENT AND TRADEMARK OFFICE
CERTIFICATE OF CORRECTION

PATENT NO. : 5,371,636

DATED : December 6, 1994

INVENTOR(S) : Ashok B. Nayak et al.

It is certified that error appears in the above-identified patent and that said Letters Patent is hereby corrected as shown below:

Column 10, line 26, "damning" should be --damping--.
Column 10, line 64, "free" should be --frame--.
Column 11, line 1, before "portion" insert --first--.
Column 11, line 6, "free" should be --frame--.

Signed and Sealed this

Twenty-third Day of May, 1995

Attest:

BRUCE LEHMAN

Attesting Officer          Commissioner of Patents and Trademarks